United States Patent [19]
Schurig et al.

[11] Patent Number: 5,694,327
[45] Date of Patent: Dec. 2, 1997

[54] ASYNCHRONOUS STATE MACHINE ATTRIBUTE COMPELLER

[75] Inventors: Edward R. Schurig, Plano; Jay T. Cantrell, Dallas, both of Tex.

[73] Assignee: Texas Instruments Incorporated, Dallas, Tex.

[21] Appl. No.: 573,891

[22] Filed: Dec. 18, 1995

Related U.S. Application Data

[63] Continuation of Ser. No. 939,255, Sep. 2, 1992, abandoned.

[51] Int. Cl.$^6$ .................................................. G06F 11/00
[52] U.S. Cl. ......................... 364/488; 364/140; 364/489; 364/490; 364/DIG. 1; 395/310; 395/555
[58] Field of Search ................................. 395/550, 725, 395/775, 555; 375/354; 364/140, 141, 143, DIG. 1, 488, 489, 490, 251.4

[56] References Cited

U.S. PATENT DOCUMENTS

| | | | |
|---|---|---|---|
| 3,761,695 | 9/1973 | Eichelberger | 371/22.3 |
| 4,366,393 | 12/1982 | Kasuya | 307/221 R |
| 4,390,969 | 6/1983 | Hayes | 364/900 |
| 4,502,112 | 2/1985 | Fujiwara et al. | 364/200 |
| 4,562,427 | 12/1985 | Ecton | 340/825.5 |
| 4,740,891 | 4/1988 | Kirkpatrick | 364/200 |
| 4,897,838 | 1/1990 | Tateishi | 371/22.3 |
| 4,912,348 | 3/1990 | Maki et al. | 307/465 |
| 5,063,536 | 11/1991 | Tinder et al. | 395/775 |
| 5,138,189 | 8/1992 | Leung et al. | 307/272.1 |
| 5,179,705 | 1/1993 | Kent | 395/725 |
| 5,228,040 | 7/1993 | Agrawal et al. | 371/22.3 |
| 5,319,678 | 6/1994 | Ho et al. | 375/106 |

*Primary Examiner*—Kevin J. Teska
*Assistant Examiner*—Thai Phan
*Attorney, Agent, or Firm*—Mark A. Valetti; Wade James Brady, III; Richard L. Donaldson

[57] ABSTRACT

A digital circuit (11) for compelling storage of attributes and for providing output signals indicating status of the storage of attributes, the digital circuit comprising: a digital storage device (26); a first combinational logic circuit (20) connected to the digital storage device (26) for enabling the digital storage device (26) to store the attributes based upon a set of stable first compelled inputs and an enable signal; a second combinational logic circuit (18) connected to the digital storage device for clearing the digital storage device (26) based upon a set of stable second compelled inputs and a clear signal; a first logic gate (30) connected to the digital storage device (26) and the first combinational logic circuit (20) for outputting a signal representative of the attribute being stored in the digital storage device (26); and a second logic gate (28) connected to the digital storage device (26) and the second combinational logic circuit (18) for outputting a signal representative of the digital storage device being cleared. The circuit advantageously reduces that number of states required by an asynchronous state machine without a significant performance degradation.

9 Claims, 2 Drawing Sheets

ASYNCHRONOUS STATE MACHINE ATTRIBUTE COMPELLER

This application is a Continuation of application Ser. No. 07/939,255, filed Sep. 2, 1992 now abandoned.

FIELD OF THE INVENTION

This invention relates to digital circuitry and in particular to an asynchronous state machine attribute compeller.

BACKGROUND OF THE INVENTION

Sequential circuits are used when prior events affect the present sequence of events and responses of the circuit. Two classifications of these circuits exist: synchronous state machines and asynchronous sequential circuits.

A synchronous state machine is a circuit that sequences from one state to another based upon inputs and a clock signal. This circuit typically includes inputs, outputs, combinational logic circuitry for providing the determination of succeeding steps and the value of the outputs, registers for clocking various signals, and a feedback path between the present state and the succeeding state. These components can be arranged in a variety of well known configurations, such as the Mealey and Moore Machines described in *An Engineering Approach to Digital Design*, Prentice-Hall, 1980, ten book by Willism L Fletcher. Simple implementation techniques make this form of circuit very popular for designs requiring sequential operation.

An asynchronous sequential circuit is sequenced responsive to input changes. It is Similar to a synchronous state machine, except that the asynchronous sequential circuit does not include registers. The asynchronous sequential circuit utilizes continuous time stable states that can be transitioned between responsive to input changes, wherein the synchronous state machine utilizes time discrete states. The use of continuous time stable states makes the asynchronous sequential circuit more difficult to reliably design. Each added state makes the design more challenging, and strict implementation rules must be followed regarding the relationship between adjacent stable states and the design of the combinational logic.

All sequential circuits operate by moving from one state to the next; this is called a sequence. Sequencing in an asynchronous sequential circuit is enabled by either self-timing or compelled operations. A self-timed operation is a method of controlling sequencing based upon the known timing characteristics of the circuit. This is implemented with a delay element in the feedback path between an output, indicating to start the delay, and the corresponding input, indicating the delay is complete, of the sequential circuit.

Compelled operations refer to the action of handshaking with some other entity in the system. The sequential circuit may generate an output to indicate it is ready, and the other entity then responds with a handshake indicating an acknowledgement. The sequential circuit and the other entity can switch roles.

Asynchronous state machines requiring a lot of states become very difficult to implement. The member of states can be reduced by storing selective state information in registers, but a speed penalty is incurred by storing all of the information.

One of the operations performed by a sequential circuit is to make decisions based on inputs. This decision process, known as a branch, is a special sequence of states that implies storage of event or sequence information. It is an object of the invention to improve branching in sequential circuits.

Each of the stored results are referred to as stored attributes or simply attributes. Another object of the instant invention is that all attributes are fully compelled with respect to the asynchronous sequential circuit. Attributes can be outputs or virtual branch flags.

Output attributes are attributes that are used by some external entity. An output attribute replaces a continuous output from the sequential circuit. Another object of the present invention is to provide a means of optimizing output manipulation and to provide a method of compelling the setting or clearing of these attributes.

SUMMARY OF THE INVENTION

An embodiment of the present invention is a method of reducing asynchronous state machine states and branches. The method stores sequential branching information, preferably attributes, in a digital storage device, preferably an R/S flip-flop or a latch. In this fashion, the event information is stored in a discrete circuit rather than in the sequential circuit itself.

Another embodiment of the present invention is a digital circuit for compelling storage of attributes and for providing output signals indicating status of the storage of attributes. The digital circuit includes a digital storage device, preferably an R/S flip-flop or a latch and a first combinational logic circuit connected to the digital storage device for enabling the digital storage device to store the attributes based upon a set of stable first compelled inputs and an enable signal. A second combinational logic circuit is connected to the digital storage device for clearing the digital storage device based upon a set of stable second compelled inputs and a clear signal. A first logic gate, preferably a NAND gate, is connected to the digital storage device and the first combinational logic circuit for outputting a signal representative of the attribute being stored in the digital storage device. A second logic gate, preferably a NAND gate, is also connected to the digital storage device and the second combinational logic circuit for outputting a signal representative of the digital storage device being cleared. Preferably, the attribute will not be stored in the R/S flip-flop if the signal representative of the attribute being stored, ack_valid_set, already signifies that the attribute has already been stored in the R/S flip-flop in a prior state. The R/S flip-flop advantageously will not be reset if the signal representative of the digital storage devices being cleared, ack_valid_clear, signifies that the R/S flip-flop has already been cleared.

Another embodiment of the present invention is a digital circuit for compelling storage of attributes and for providing output signals indicating status of the storage of attributes. The digital circuit includes a digital storage device and a first combinational logic circuit connected to the digital storage device for enabling the digital storage device to store the attributes based upon a set of stable first compelled inputs and an enable signal. A second combinational logic circuit connected to the digital storage device clears the digital storage device based upon a set of stable second compelled inputs and a clear signal. A first logic gate connected to the digital storage device and the first combinational logic circuit outputs a signal representative of the attribute being stored in the digital storage device. A second logic gate connected to the digital storage device and the second combinational logic circuit outputs a signal representative of the digital storage device being cleared. The attribute advantageously will not be restored in the digital storage device if the signal representative of the attribute being stored signifies that the attribute has already been stored in the storage device. The digital storage device will not be cleared if the signal representative of the digital storage device being cleared signifies that the digital storage device has already been cleared.

DETAILED DESCRIPTION OF PREFERRED EMBODIMENTS

Figure 1:
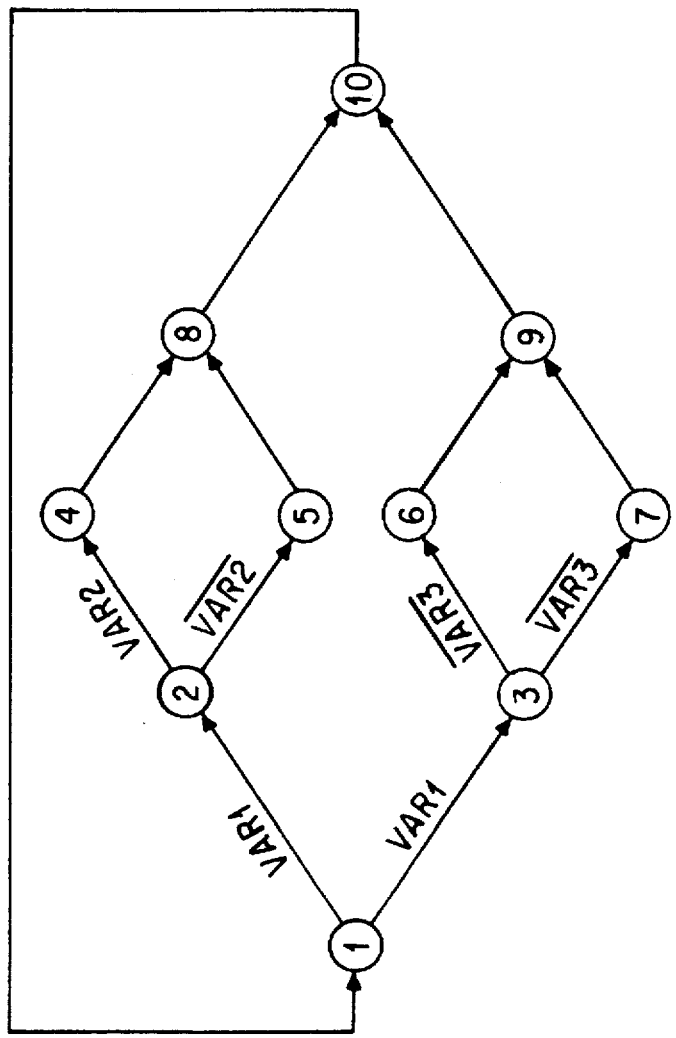
FIG. 1 is a simplified virtual state diagram.

FIG. 1 is a simplified virtual state diagram that is presented as an example in order to describe various aspects of the invention. The number of states and inputs shown in FIG. 1 is not intended to imply that the invention can only be implemented for simple state diagrams. In the contrary, the present invention can be applied to any state diagram.

Referring to FIG. 1, in order to further simplify this example, to advance from state 1 to state 2 variable 1, var1, must be high, logic 1; to advance from state 1 to state 3 var1 must be low, logic 0; to advance from state 2 to state 4 variable 2, var2, must be high; to advance from state 2 to state 5 var2 must be low; to advance from state 3 to state 6 variable 3, var3, must be high; to advance from state 3 to state 7 var3 must be low. Transitions from states 4 or 5 to state 8, from states 6 or 7 to state 9, or from states 8 or 9 to state 10 can occur without any variables or inputs changing or they can occur based on receiving a particular input. For example, it is possible to transition directly from state 2 to state 8 (via states 4 or 5) based solely upon the value of var2.

Figure 2:
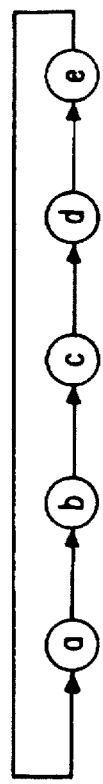
FIG. 2 is a simplified physical state diagram.

FIG. 2 is a physical state diagram which corresponds to the virtual state diagram of FIG. 1 by means of the attribute compeller of the present invention. Attributes are used to store state machine branching history in the physical state diagram of FIG. 2, whereas the virtual state diagram of FIG. 1 has additional states because it does not utilize attributes to store the branching history.

State "a" of FIG. 2 corresponds to state 1 of FIG. 1; state "b" corresponds to states 2 and 3; state "c" corresponds to states 4, 5, 6, and 7; state "d" corresponds to states 8 and 9; and state "e" corresponds to state 10.

Figure 3:
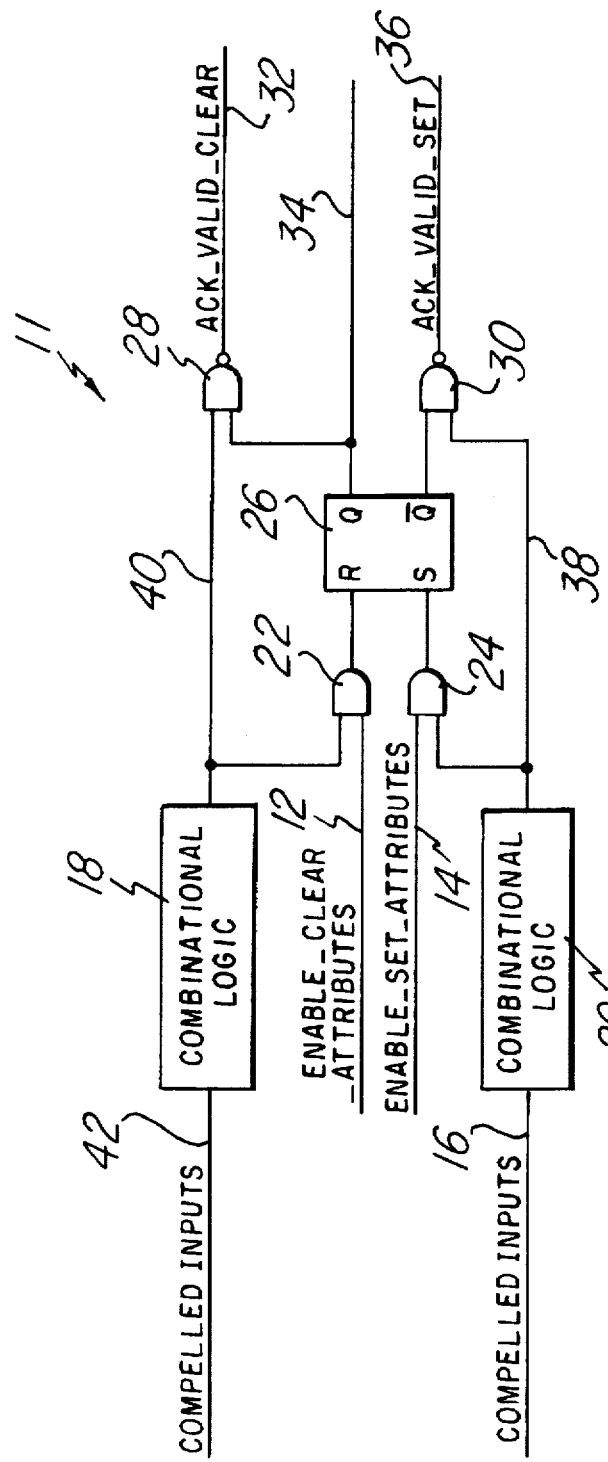
FIG. 3 is a circuit diagram of the preferred embodiment of the invention.

FIG. 3 is a circuit diagram of a single attribute compeller. According to the preferred embodiment of the invention, preferably, an attribute compeller 11 is provided for each attribute associated to a physical state machine. Attribute compeller 11 has four inputs and three outputs. The four inputs are: compelled inputs 16 and 42, enable_set_attributes 14 (en_set_attr), and enable_clear_attributes 12 (en_cl_attr). The three outputs are: ack_clear 32, attribute 34 (attr), and ack_set 36. Compelled inputs 16 are connected to combinational logic block 20. En_set_attr line 14 is connected to one input of AND gate 24 and the output of combinational logic block 20 is connected to the other input of AND gate 24. Compelled inputs 42 are connected to combinational logic block 18 and the output of combinational logic block 18 is connected to one of the inputs of AND gate 22. The other input of AND gate 22 is connected to en_cl_attr line 12. Preferably, the output of AND gate 22 is connected to the reset port of R/S flip-flop 26, and the output of AND gate 24 is connected to the set port of R/S flip-flop 26. The output of combinational logic block 18 and the Q output of R/S flip-flop 26 are the two inputs to NAND gate 28. The output of NAND gate 28 is ack_clear line 32. The Q output of R/S flip-flop 26 is also attribute output 34. The output of combinational logic block 20 and the $\bar{Q}$ output of R/S flip-flop 26 form the two inputs to NAND gate 30, and the output of NAND gate 30 is ack_set output 36.

The output of combinational logic blocks 18 and 20 are the variables used to transition from state to state. In a case where the attributes are only being set, the variables (such as var1 and var2) would be output onto line 38 by combinational logic block 20 in response to the input of the compelled inputs into combinational logic block 20.

For example, in a case where the progression of states is from state 1 (FIG. 1), to state 2, then to state 5, then to state 8, and finally to state 10, there will be two variables used in order to change states in the virtual state machine of FIG. 1. In the physical state machine of FIG. 2, two attributes will be required. Starting at state "a", in a first attribute compeller 11 the en_set_attr is enabled and compelled inputs are input into combinational logic block 20 via line 16. In this example the output of combinational logic block 20 is a logical 1 value, also referred to as a high value, thus making the output of AND gate 24 a logical 1 value. This results in R/S flip-flop 26 being set (i.e. R/S flip-flop is enabled to store a logical 1 value), attribute output 34 transitioning to a logical 1 value, and the $\bar{Q}$ output of R/S flip-flop 26 transitioning to a logical 0 value. Once the $\bar{Q}$ output of R/S flip-flop 26 settles to a logical 0 value, the output of NAND gate 36, which is the ack set signal, transitions to a logical 1 value. The transitioning of the ack set signal to a logical 1 value signals the remaining circuitry that the attribute associated to this particular attribute compeller, which in this example is attribute 1, is stored in the R/S flip-flop associated to this attribute compeller, and signals the movement from state "a" to state "b" in the physical state machine. In this example, the movement from state "a" to state "b" in the physical state diagram of FIG. 2 and the assertion of the first attribute equates to the movement from state 1 to state 2 in the virtual state diagram of FIG. 1.

In this example, the next step is to move from state 2 to state 5 in the virtual state diagram of FIG. 1, which corresponds to moving from state "a" to state "b" in the physical state diagram of FIG. 2. This is accomplished by enabling the en_set_attr line 14 of a second attribute compeller 11. The compelled inputs 16 of this attribute compeller will cause the output of combinational logic 20 to be a logical 0 value, which results in the output of AND gate 24 to be a logical 0 value and the output of NAND gate 30 to be a logical 1 value. This results in the R/S flip-flop, which was preferably reset with all the other R/S flip-flops prior to entering state "a", associated to this attribute compeller not to be set. The enabling of the ack set output without having to wait for the R/S flip-flop to be set (which occurs because the ack set output was enabled directly from the output of combinational logic circuit 26) is an advantageous aspect of the present invention. Upon the transition of the ack set output via line 36 to a logical 1 value, the transition from state "b" to state "c" in the physical state diagram (or from state 2 to state 5 in the virtual state diagram) is complete.

Because state 8 is the only state whenever it is possible to transition to from state 5, in this example, the transition from state 5 occurs without setting another attribute. This is also true for the transition from state 8 to state 10. It is possible, though, that in any of these states, one or more attributes can be set to act as a flag or to anticipate a future action. If an attribute is set prior to the state that requires that that attribute be set, the attribute compeller associated with that attribute will operate more quickly because the Q output of the R/S flip-flop of the attribute compeller will be at a logical 1 value and the $\overline{Q}$ output will be at a logical 0 value which causes the ack set output to be at a logical 1 value. By having the ack set output at a logical 1 value upon accessing the attribute compeller, additional time does not have to be wasted by setting the R/S flip-flop, again.

Figure 4:
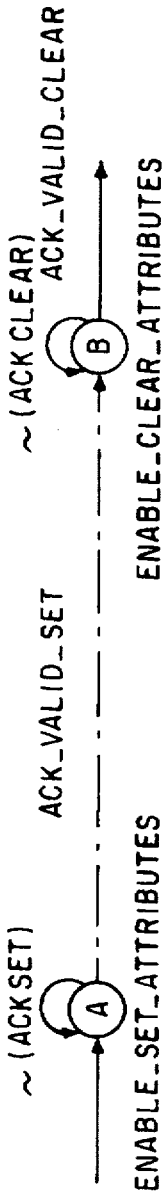
FIG. 4 is a generic physical state diagram that summarizes an aspect of the invention.

FIG. 4 illustrates a detail of the virtual state diagram of FIG. 2 as it relates to the attribute compeller of FIG. 3. FIG. 4 shows an example of a state that will compel the setting of an attribute if it needs to be set, and a state that will compel the clearing of an attribute if it needs to be cleared. The ENABLE_SET_ATTRIBUTES output from state A will set the attribute if combinational logic output 38 is a logic 1. The set attribute state, state A, waits for compeller 11 (FIG. 3) to indicate that the attribute has either been set or does not need to be set by observing the ACK_VALID_SET output on line 36 (FIG. 3). Similarly, the clear attribute state, state B, waits for compeller 11 (FIG. 3) to indicate that the attribute has either been cleared or does not need to be cleared by observing the ACK_VALID_CLEAR output on line 32 (FIG. 3). The performance of the state machine in FIG. 4 is improved for all cases that ACK_VALID_SET or ACK_VALID_CLEAR are already at a logical 1 value prior to entering state A or state B, respectively. This happens one of two ways: combinational logic, whose output must be stable prior to setting or clearing an attribute, is at a logical 0 value indicating that the attribute is valid and does not need to be set or cleared; or the attribute is already set (state A) or already cleared (state B) from prior state machine activity. The compellers in these cases allow the state machine to continue immediately without waiting a fixed delay to load register 26 (FIG. 3).

Although the invention has been described with reference to a preferred embodiment herein, this description is not to be construed in a limiting sense. Various modifications of the disclosed embodiments will become apparent to persons skilled in the art upon reference to the herein description. It is therefore contemplated that the appended claims will cover any such modifications or embodiments as fall within the true scope of the invention.

What is claimed is:

1. A digital circuit for compelling storage of an attribute and for providing output signals indicating status of said storage of said attribute, said digital circuit comprising:

a digital storage device that can be set or cleared;

a first combinational logic circuit connected to said digital storage device for setting said digital storage device to set said attribute based upon a group of first compelled inputs and a set-enable signal;

a second combinational logic circuit connected to said digital storage device for clearing said digital storage device based upon a group of stable second compelled inputs and a clear-enable signal;

a first logic gate connected to said digital storage device and said first combinational logic circuit for outputting a set-acknowledge signal which is representative of said attribute being set; and a second logic gate connected to said digital storage device and said second combinational logic circuit for outputting a clear-acknowledge signal which is representative of said digital storage device being cleared;

wherein if said digital storage device is already set or is attempted to be set based on said group of first compelled inputs then said set-acknowledge signal goes to a logical high value regardless of said set-enable signal and once said set-acknowledge signal goes to a logical high value said attribute will not be reset in said digital storage device if such setting is subsequently attempted, and if said digital storage device is already cleared or is attempted to be cleared based on said group of second compelled inputs then said clear-acknowledge signal goes to a logical high value regardless of said clear-enable signal and once said clear-acknowledge signal goes to a logical high value said digital storage device will not be cleared in a subsequent attempt to do such.

2. The digital circuit of claim 1, wherein said digital storage device is selected from the group consisting of: an R/S flip-flop or an R/S latch.

3. The digital circuit of claim 1, wherein said first logic gate is a NAND gate.

4. The digital circuit of claim 1, wherein said second logic gate is a NAND gate.

5. The digital circuit of claim 1, wherein said digital storage device is an R/S flip-flop.

6. The digital circuit of claim 5, wherein said enabling said digital storage device to store is setting said R/S flip-flop.

7. The digital circuit of claim 5, wherein said clearing of said digital storage device is resetting said R/S flip-flop.

8. The digital circuit of claim 1, wherein said signal representative of said attribute being stored will immediately signify that said digital circuit is complete when said first compelled inputs are such that said attribute is not supposed to be stored.

9. The digital circuit of claim 1, wherein said signal representative of said digital storage device being cleared will immediately signify that said digital circuit is complete when said second compelled inputs are such that said digital storage device is not supposed to be cleared.

* * * * *